US006809292B2

(12) United States Patent
Spear et al.

(10) Patent No.: US 6,809,292 B2
(45) Date of Patent: Oct. 26, 2004

(54) SYSTEM AND METHOD PROVIDING AUTOMATED WELDING INFORMATION EXCHANGE AND REPLACEMENT PART ORDER GENERATION

(75) Inventors: Theresa M. Spear, Highland Heights, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 96 days.

(21) Appl. No.: 10/264,833

(22) Filed: Oct. 4, 2002

(65) Prior Publication Data

US 2003/0042288 A1 Mar. 6, 2003

Related U.S. Application Data

(63) Continuation of application No. 09/796,192, filed on Feb. 28, 2001, now Pat. No. 6,486,439, and a continuation-in-part of application No. 09/770,064, filed on Jan. 25, 2001, now Pat. No. 6,624,388.

(51) Int. Cl.[7] ................................................ B23K 9/10
(52) U.S. Cl. ............................. 219/130.5; 219/125.1; 219/136; 700/117; 705/26
(58) Field of Search .......................... 219/125.1, 130.5, 219/130.01, 137 R, 136; 901/42; 700/95, 96, 106, 107, 117, 249; 705/26, 28, 29; 702/184; 709/219

(56) References Cited

U.S. PATENT DOCUMENTS

| 5,353,238 | A | * | 10/1994 | Neef et al. ................... 702/184 |
| 5,463,555 | A | | 10/1995 | Ward et al. .................. 364/468 |
| 5,805,442 | A | * | 9/1998 | Crater et al. ................... 700/9 |
| 5,808,885 | A | | 9/1998 | Dew et al. ................... 364/132 |
| 6,002,104 | A | | 12/1999 | Hsu ......................... 219/130.5 |
| 6,486,439 | B1 | | 11/2002 | Spear et al. ................ 219/136 |
| 2002/0107825 | A1 | * | 8/2002 | Manicke et al. .............. 706/47 |

FOREIGN PATENT DOCUMENTS

EP 0463489 6/1991

OTHER PUBLICATIONS

ArcLink Functional Specification, Engineering Document, The Lincoln Electric Company, Aug. 1997, p. 1–38.
The Nist Automated Arc Welding Testbed, W.G. Rippey, et al., 7th International Conference on Computer Technology in Welding, San Francisco, CA, Jul. 8–11, 1997. p. 1–8.

* cited by examiner

Primary Examiner—Clifford C. Shaw
(74) Attorney, Agent, or Firm—Amin & Turocy, LLP

(57) ABSTRACT

A welding and network information system and methodology is provided in accordance with the present invention. The system includes a welder operatively coupled to a server and a network interface to enable a network architecture, the network architecture serving a network that communicates with at least one remote system, wherein the remote system includes at least one remote interface to communicate with the network architecture and provide welding information to a user, wherein the remote system accesses at least one HTTP socket to establish web communications with the welder and loads at least one application from the welder, wherein the remote system accesses at least one Welding Application socket via the at least one application to exchange information between the welder and the remote system, the at least one application includes at least one welding information broker to determine whether the welding information in a local database is to be updated, the user receives the welding information via the remote interface and the local database or the remote interface and the network. The present invention enables automated order and fulfillment of items such as replacement parts and/or welding programs and procedures.

27 Claims, 9 Drawing Sheets

SYSTEM AND METHOD PROVIDING AUTOMATED WELDING INFORMATION EXCHANGE AND REPLACEMENT PART ORDER GENERATION

RELATED APPLICATIONS

This application is a continuation of U.S. patent application Ser. No. 09/796,192, which was filed on Feb. 28, 2001, now U.S. Pat. No. 6,486,439 entitled SYSTEM AND METHOD PROVIDING AUTOMATED WELDING INFORMATION EXCHANGE AND REPLACEMENT PART ORDER GENERATION. This application is also a continuation in part of U.S. patent application Ser. No. 09/770,064, which was filed Jan. 25, 2001, now U.S. Pat. No. 6,624,388 entitled SYSTEM AND METHOD PROVIDING DISTRIBUTED WELDING ARCHITECTURE.

TECHNICAL FIELD

The present invention relates generally to computer and welding systems, and more particularly to a system and method providing local and/or remote technical information transfers to welders via a weld object that provides links to the most recent welding operating, training, troubleshooting and servicing information, wherein users may determine/select replacement components from the information and automatically initiate orders associated with a replacement part selection.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modem and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall joining, fabrication and/or other production process. Thus, controlling, maintaining, servicing and supplying multiple and isolated locations in large centers, and/or across the globe, has become more challenging, time consuming and expensive.

One such challenge relates to providing relevant and/or current technical information to welding system operators. This information can be in a variety of forms such as service manuals, training and operating manuals, troubleshooting manuals, schematics, and/or any information relating to operating and servicing the welding system. The information is often stored in document or manual form and generally remains unchanged after initial shipment and installment of the welding system. If a problem occurs with the welder, or if routine maintenance is to be performed, and/or if a new/current operator needs more specific information to perform new or different welding tasks, this information generally has to be retrieved manually by the operator from a file cabinet or other filing location that may not even be located on the production floor. Valuable time is then generally expended searching for the necessary documents. The time expended may include searching through documents of unrelated welding systems that service other portions of the production process. Even after a manual or document location is found, there is substantially no assurance that the retrieved document provides the latest or most recent information for a particular welding system. For example, the welding system may have undergone several upgrades (e.g., application software enhancements, welding program changes, weld controller firmware changes, hardware component changes) before an operator needs to perform a service procedure such as troubleshoot and replace a faulty welding component. If an older manual is retrieved that does not reflect the current state of the welding system, however, faulty diagnosis may occur. Consequently, this may lead to expensive troubleshooting costs and other costs relating to purchasing incorrect components that may not in fact be defective. Thus, extra welding system downtime may occur because of incorrect diagnosis and selection of non-defective replacement parts.

Once a component has been determined for replacement by a weld system operator or technician, another costly and time-consuming procedure generally follows. This involves ordering and purchasing the suspected defective component or part. The operator generally has to look-up the part in a manual, find the related part number, determine who supplies the part, and look the part up in a supplier's catalog. When the supplier has been determined, a phone call or FAX is placed to determine availability and price information, and then a purchase order is generated and transmitted to the supplier to fulfill the order. Assuming that the part has been entered correctly by the purchaser and processed correctly by the supplier, the part may then arrive at the welder wherein a replacement can then occur. Unfortunately, the above process involves many time-consuming and manual steps-sometimes involving error. Thus, much time can be expended receiving inadequate or incorrect replacement parts. If many welders are serviced by many different operators in this manner, as is often the case in larger welding environments, these problems become magnified.

Due to the problems described above and other problems associated with conventional welding systems, there is an unsolved need for an improved welding architecture to facilitate remote information transfers and parts distribution to multiple welding systems that may be distributed across large areas or regions.

SUMMARY OF THE INVENTION

The following presents a simplified summary of the invention in order to provide a basic understanding of sonic aspects of the present invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to provide an automated transfer of relevant and up-to-date information relating to welding systems and to enable automatic replacement part or weld program order generation from the information. This is achieved without requiring an operator to perform exhaustive searches for the information and/or to manually perform conventional steps relating to replacement component purchases and acquisitions. An operator may retrieve and utilize the information via a network architecture/interface to operate and maintain the welding system, for example, wherein the information may be associated with troubleshooting, servicing, maintaining, and operating the welding system. Upon obtaining the relevant information, the operator or user may learn new or current operating procedures and/or determine replacement components indicated by the retrieved information for components that are defective and/or need replacement in the routine course of maintaining the welding system. Additionally, the user can automatically order new welder programs or procedures that control the welding system and process. An automated order generation system then enables the operator to initiate replacement component and/or welder program/procedure purchases based on selections provided in the retrieved information. In this manner, the operator can retrieve information associated with the welding system without having to perform searches or physically locate a particular item that may or may not contain the most recent welding system information. If a component or program needs replacement, a component/program purchase can automatically be triggered by selecting the desired component or program within the retrieved information. Thus, errors associated with outdated documentation and manually driven purchasing systems are mitigated.

In accordance with the present invention, a welding information broker is employed to determine the current state of the welding system. The broker solicits individual welding components over an internal welding system bus with the current state of one or more of the components that contribute to the architecture of a particular welding system. This may also include receiving version information relating to the availability of the information residing in the welding system. The welding information broker is then linked to a remote network server with an object list or table of all documentation relating to the particular welding system as defined by the weld broker. A local data store is examined according to the list to determine if the documentation is up to date and available locally at the welding system. An interface such as a browser may then be utilized to view the documentation from the local data store. If the documentation is not available locally, a download may be automatically initiated to transfer the most recent documentation to the local data store. Alternatively, the documentation may be examined by the weld system operator or user at the remote location. In such a case, a document pointer may be stored to point to the remote location.

In the course of utilizing the documentation, the welding system operator may learn new welding procedures, perform routine maintenance, and/or troubleshoot the welding system via schematic documentation, for example. If a part or component is determined for replacement, and/or if a new welder program/procedure is desired, the welding system operator may initiate a purchase of the part or program by selecting (e.g., mouse click) the part within the documentation. This is achieved by linking the welding broker to a remote inventory and distribution system and updating the broker with purchasing information relating to the welding system, the selected part and associated part suppliers. Based on the purchasing information associated with the welding system, a purchase order may be automatically generated and transmitted to the supplier, wherein the order may then be automatically fulfilled without utilizing conventional manual ordering processes (e.g., typing orders, phoning suppliers, looking up parts in catalogs). Automated ordering of welder programs or procedures may be similarly initiated.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
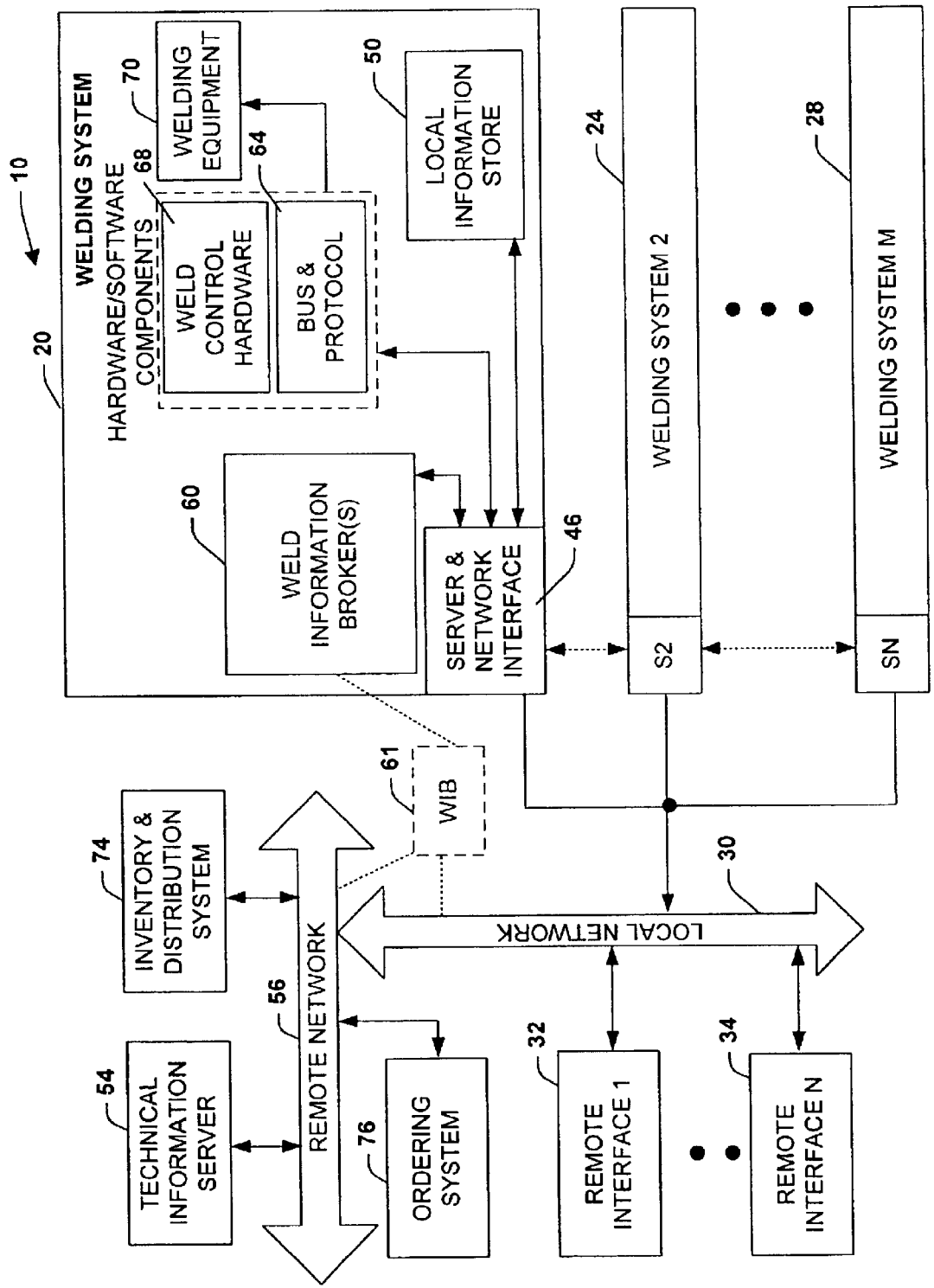
FIG. 1 is a schematic block diagram illustrating an automated welding information and parts distribution architecture in accordance with an aspect of the present invention.

The present invention relates to a system and methodology to provide a distributed welding architecture wherein a plurality of welders and/or other remote systems provide automated information exchange and ordering via a higher-level network architecture adapted to the welding process. As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

The present invention relates to a system and method to provide welding system information to welding operators via a network server and a welding information broker(s) to determine and load the most recent welding system information. The information may include documentation such as operating and service manuals, and include information associated with the welding process and procedures that can be employed as an interactive training tool for welding operators/users, for example. Remote diagnostic assistance can be provided that interacts with maintenance personnel prompting them to check various components in the welding system while providing test procedures and suitable technical documentation such as machine schematics. Testing and calibration of the welding system can also be provided along with scheduled system maintenance, service and downtime via the interactive process. The network server links the welding system to remote order, inventory and distribution servers in order that replacement components or other items such as welder procedures in a downloadable program format can automatically be ordered as a result of interactive processes. Orders may be initiated, for example, by selecting components and/or welder programs from the retrieved welding system information. An operator can initiate a purchase order by selecting the component/procedure via a networked user interface and from a plurality of locally and/or remotely retrieved documents.

A network server and associated interface are operatively coupled to a welder to enable remote information exchange and automated ordering of the present invention. The network server executes a plurality of functional objects to interact with various portions of the welding process. These objects may be invoked from a remote system via network sockets adapted to the welder and associated with the network server and the objects. The remote system and/or other welding system may "bootstrap" components and/or applications for interacting with the functional objects (e.g., weld controller, monitor, communications tasks, applets) provided by the network server.

The network server may also include interacting with web pages for example, and may provide access to a remote system/browser and/or local browser to interface with the welder. The remote system includes at least one standard socket (e.g., HTTP) for web communications and at least one custom socket (e.g., Welding Application Socket) to exchange information between the welder and the remote system. For example, the standard socket can be an HTTP socket, an FTP socket, a TELNET socket, and/or other network socket. It is noted that the terms "web" and "http" are substantially interchangeable, however, "web" does not include FTP or TELNET which are separate protocols. The standard socket enables the remote system to load a variety of applications and/or tools that facilitate system performance and access to the applications and/or tools. For example, the applications may invoke or bootstrap Welding Application sockets that encapsulate a welding system's native addressing and command arguments, wherein suitable routing and request arguments may be served by a welder's native network and operating system. The network may employ User Datagram Protocol (UDP) protocol, wherein a client system may proxy requests over the socket to/from a welder's native system. The welder's native system may include one or more control processors and a native welding Local Area Network (LAN) connecting the control processors with one or more logical processes and/or "objects" executing on the control processor. A database provides access to methods/properties exhibited by each object.

Referring initially to FIG. 1, a system 10 illustrates an automated welding information parts and welder program distribution architecture in accordance with an aspect of the present invention. The system 10 includes a welding system 20, one or more other welding systems. depicted as welding system 24, and welding system M 28, M being an integer, that are operatively coupled via a local network 30. One or more remote interfaces 32 and 34 (e.g., web browser) interact with the welding systems 20–28 across the network 30 and enables a welding operator or user to service, maintain and/or update the welding systems. This is achieved by providing relevant welding system information, such as operating guides and training information, to the welding operator at the remote interfaces 32 and/or 34. The welding information is communicated from the welding system 20 to the remote interfaces 32, 34 by a server and network interface 46 and may include a web server that opens network sockets (not shown) to transmit the welding information. The welding information may be provided from a local information store 50 (e.g., database) and/or from a technical information server 54 that resides on a remote network 56 such as the Internet. It is noted that the local information store 50 can reside within the welding systems 20–28 and/or reside as a separate entity on the local network 30. The local network 30 may be connected to the remote network 56 via a Local Area Network (LAN) bridge connection (not shown), however, it is to be appreciated that a single network may service the system 10.

In accordance with one aspect of the present invention, one or more welding information brokers 60 are employed to facilitate retrieval of the most recent welding information at the remote interfaces 32 and 34. The welding information broker 60, which can be a component and/or object and executed/instantiated by the server and network interface 46 and/or can operate as a separate entity 61 (e.g., local or remote computer) on the local network 30 or remote network 56, interrogates a local bus 64 to determine the particular hardware components and/or software that define the welding system 20. These components may include weld control hardware 68 that controls associated welding equipment 70, wherein the welding equipment 70 is the physical hardware producing the weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source (not shown). The weld control hardware 68 may include a weld controller (not shown), an arc/weld monitor (not shown), and weld I/O and communications interface (not shown) to control the welding equipment 70. The local bus 64 provides component version information, such as a revision number or code, to indicate the particular components that arc included in the welding system 20. When welding technical information is requested by the remote interfaces 32 or 34, the welding information broker 60 and/or 61 is linked (e.g., associated with a domain name of a website containing welder technical documents) to the technical information server 54 to determine welding information that is applicable to the welding system 20.

The link may include updating the broker with list or table of codes indicating one or more most recent document version numbers or codes associated with the component version codes contained within the welding information broker 60. The broker examines document revision levels (e.g., level 2 versus level 3) within the local information store 50 to determine if the version levels are at a similar level as the updated document version levels within the welding information broker 60. If the information in the local information store 50 is at an older or lower revision, the welding information broker 60 and/or 61 can initiate a download of the latest technical information from the technical information server 54 to the local information store 50.

It is noted, that before the download, the welding information broker 60, 61 can check/compare the compatibility of a new or updated version document with the existing hardware, and/or check compatibility with other software that coexists therewith, and/or with other welding programs/procedures that coexist. The broker also may check/verify certification requirements to determine if new upgrades will affect the welding procedure certification and if the welding procedure should be re-certified. Alternatively, the broker can obtain approval from a responsible party of the welding system 20–28 before the initiation of the download. As an alternative to the download, the welding operator or user may choose to view the latest technical information remotely from the technical information server 54. By establishing the link between the weld information broker 60 and the technical information server 54, relevant and up-to-date-welding information is retrieved automatically without causing the operator to search for the information or determine if the information is current. In this manner, much time is saved over conventional welding systems.

After the welding information is retrieved from the local information store 50 or the technical information server 54, the welding operator may interactively operate, service, and maintain the welding system 20 via the remote interface 32 and/or 34 and the retrieved information. This may include providing training or servicing procedures from the local information store 50 and performing troubleshooting via welding diagrams such as schematics, for example. If it is determined that a hardware component needs to be replaced as part of routine servicing or troubleshooting, and/or if a new welder program/procedure is desired, the welding operator may initiate an automatic order of the component or program/procedure by selecting (e.g., mouse click part on a schematic) the component/program from the remote interface 32, 34. As will be described in more detail below, the welding information broker 60 can be linked to an inventory and distribution system 74 wherein component and supplier information (e.g., part numbers, supplier address, price, shipping terms) are updated within the broker and associated with the hardware, software, and/or other version codes within the broker. An ordering system 76 (e.g., remote server) linked to the welding information broker 60 provides purchase history and related information for the welding system 20. The ordering system 76 includes information relating to an entity that purchased the welding system 20, billing and shipping addresses for the entity, and credit information concerning account status and warranty information associated with the welding system 20 and the entity. For example, if a replacement component is under warranty, a flag may be set within the ordering system 76 indicating that no charge is to be accessed relating to the replacement component. The ordering system 76 and the information contained therein enables automatic acquisition of the selected replacement component by linking the entity's billing, shipping and warranty information with the welding information broker 60, thus mitigating manual purchase order generation and negotiations involved with conventional welding systems.

Figure 2:
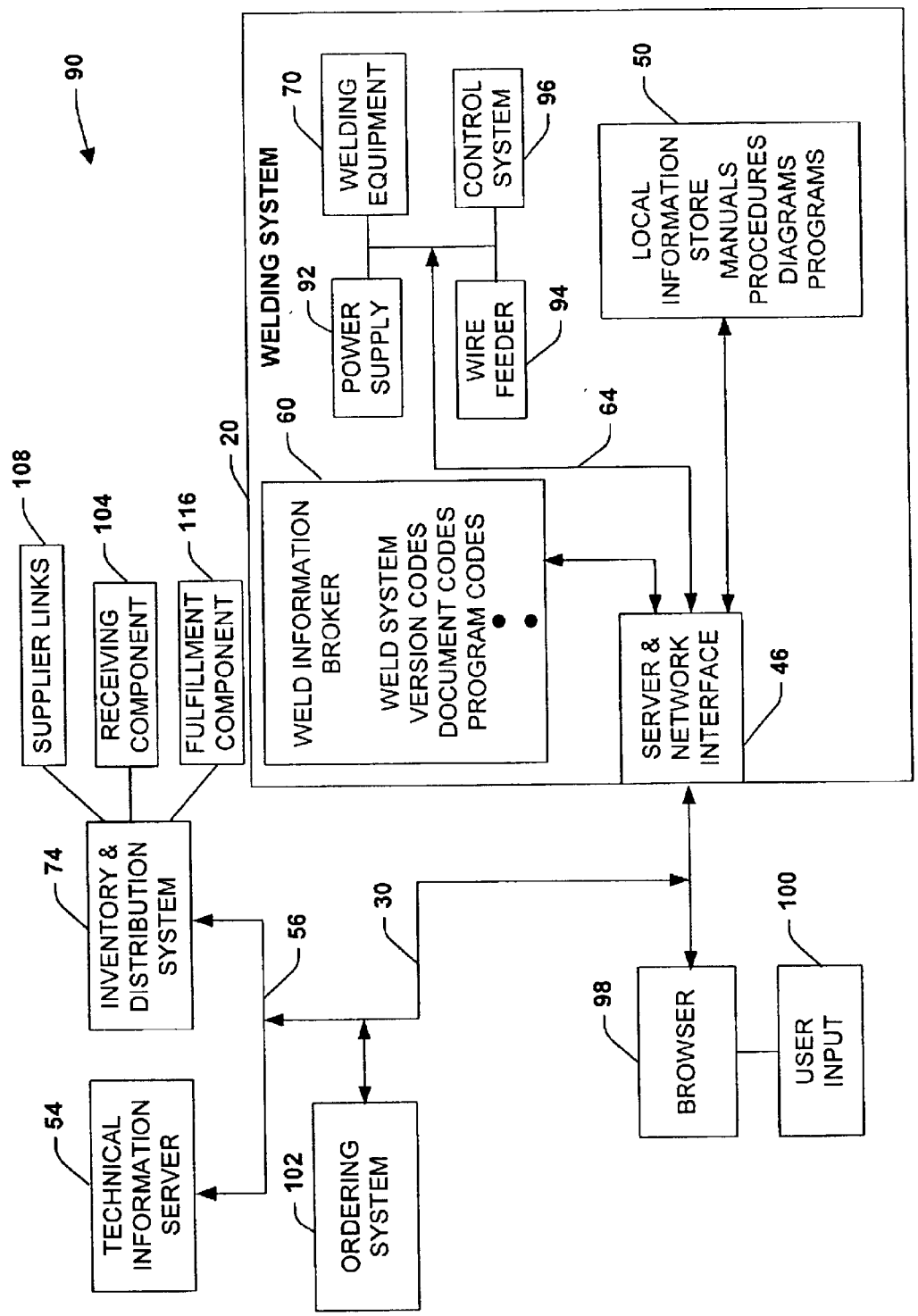
FIG. 2 is a schematic block diagram illustrating an exemplary welding network information and part acquisition system in accordance with an aspect of the present invention.

Referring now to FIG. 2, a system 90 illustrates an exemplary welding network information and part acquisition system in accordance with the present invention. The system 90 includes the welding information broker 60 that can access/retrieve version information via the local welding system bus 64. The local bus 64 may include a Controller Area Network (CAN) employing Arc Links or other protocols, for example, that communicates to welding system components such as a power supply 92, a wire feeder 94, a control system 96 and the welding equipment 70. The information received from the welding system components may include manufacturing history information or codes, machine type codes, model and serial numbers or codes, and/or software and hardware version numbers or codes. It is to be appreciated that other descriptive information or codes may be received from the welding system components 70, 92–96 and/or other welding components (not shown). After the welding information broker 60 is updated, links are established with the technical information server 54 (e.g., connect to a predetermined URL). The version information contained within the welding information broker is then utilized to search for all documents and information within the technical information server 54. The search is constrained by the technical information server 54 to include documents defined by the version information within the broker.

The welding information broker 60 is updated/compared with the technical information server 54 to reflect the latest document version levels relating to the welding components on the local bus 64 or other components within the welding system 20. The broker then compares the document version levels with document version levels that are stored locally at the local information store 50. If the latest document version is available locally, a browser 98 is served with the local welding information from the local information store 50. As described above, if the local information is at an older or lower version level, the welding information broker 60 initiates a download after verification of the version levels (e.g., requesting particular information or programs at more recent revision level) from the technical information server 54 or provides the welding operator an option to view the documents or programs remotely from the browser 98. As described above, it is to be appreciated that local information store 50 and/or the welding information broker 60 can be executed within the welding system 20 and/or as a separate entity operatively coupled to the welding system.

When the most recent welding information has been located and provided to the browser 98, the welding operator/user may proceed to service, operate, and/or troubleshoot the welding system 20 from the retrieved information. This may include following procedures or diagrams that indicate potential replacement components within the welding system 20. Additionally, the welding system may need to adapt to a different type of welding process. Thus, the operator or user may automatically initiate a purchase and subsequent download of a suitable welder program or procedure to re-configure the welding system 20. A user input 100 such as a mouse, keyboard, touch screen or other suitable device enables the welding operator to select a desired replacement component or procedure. If a component/procedure is selected for replacement, a component number or code associated with the component/procedure is linked the remote inventory and distribution system (IDS) 74 via the broker 60. The IDS 74 that may include information such as bill of material and supplier information (e.g., Enterprise Resource Planning system) interacts with the welding information broker 60 and determines a suitable replacement part via a receiving component 104. This may include querying an ordering component 102 and supplier parts database (e.g., service or spare parts) and/or network 108 for relevant purchasing information. The purchasing information may include, supplier names and addresses, price, availability, delivery terms, payment terms and/or other information relating to acquiring a replacement component. The purchasing information may also include billing, shipping, address, order history and warranty information/status associated with a purchaser/owner of the welding system 20.

The receiving component 104 provides the welding information broker 60 with the purchasing information and notifies (e.g., flag, e-mail) the broker that purchasing information related to the selected component or procedure from the browser 98 is available. The welding information broker 60 then invokes the ordering system 102 to generate an electronic purchase order utilizing the purchasing information within the broker. For example, the ordering system 102 may access the selected part number within the broker 60, update (e.g., output part/supplier/purchaser data to a file) an electronic purchase order with supplier address, price, terms and shipping information that includes the address of the owner of the welding system 20. The ordering system 102 then submits a completed purchase order to a fulfillment component 116 associated with the IDS 74. The fulfillment component 116 inputs/reads the purchase order, determines whether any warranty or other actions apply to the purchase order, and transmits the purchase order to the replacement part-supplier (e.g. e-mail, on-line service). Notice may also be sent to the welding operator indicating that an order has been placed and when delivery is expected. It is noted that automatic replacement part or welder procedure ordering is initiated at the user input level, such as from the browser 98 and can be from a single user action such as a keystroke or mouse click within an associated technical manual or document viewable on the browser 98.

Figure 3:
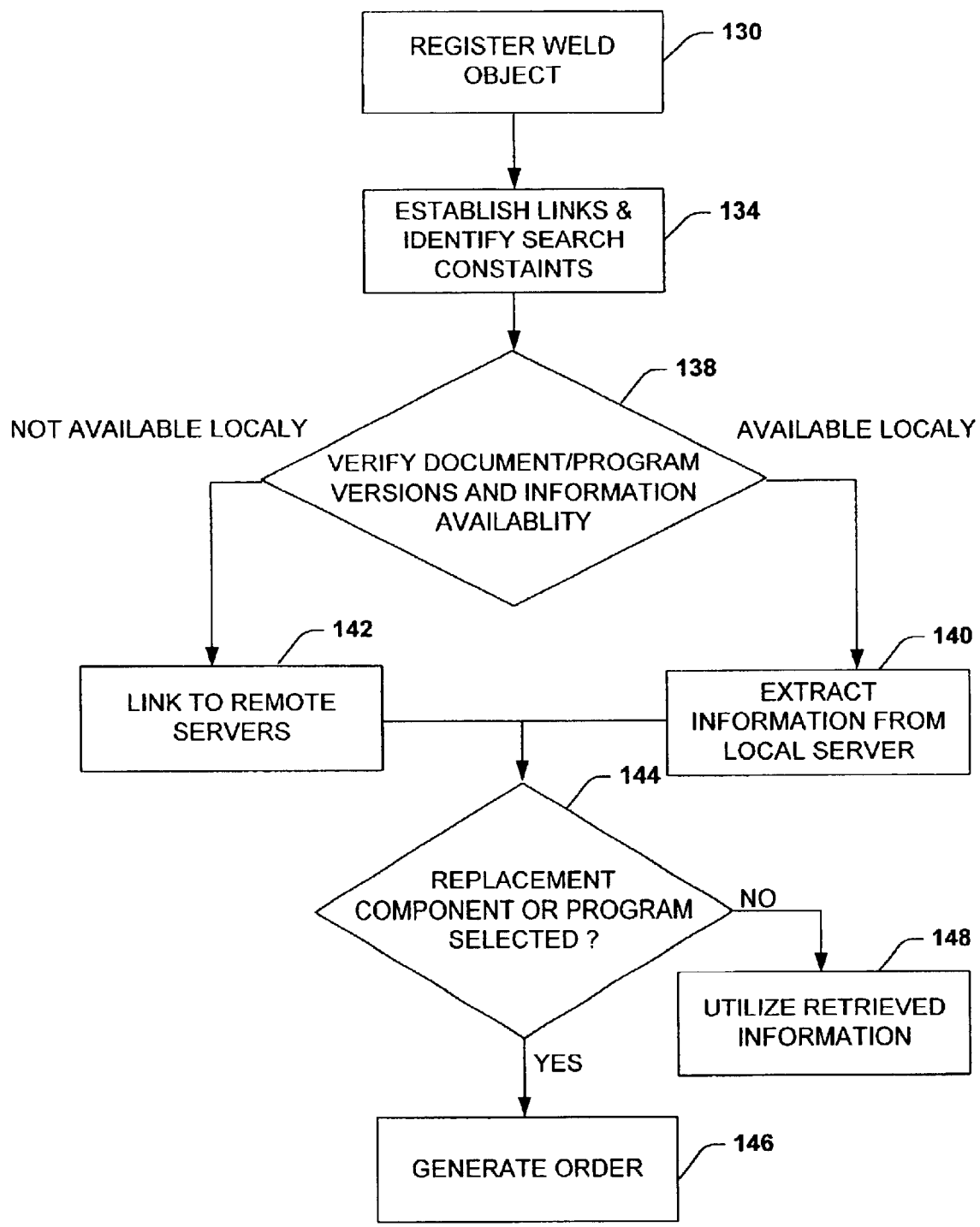
FIG. 3 is a flow chart diagram illustrating local or remote welding information transfers in accordance with an aspect of the present invention.
Figure 5:
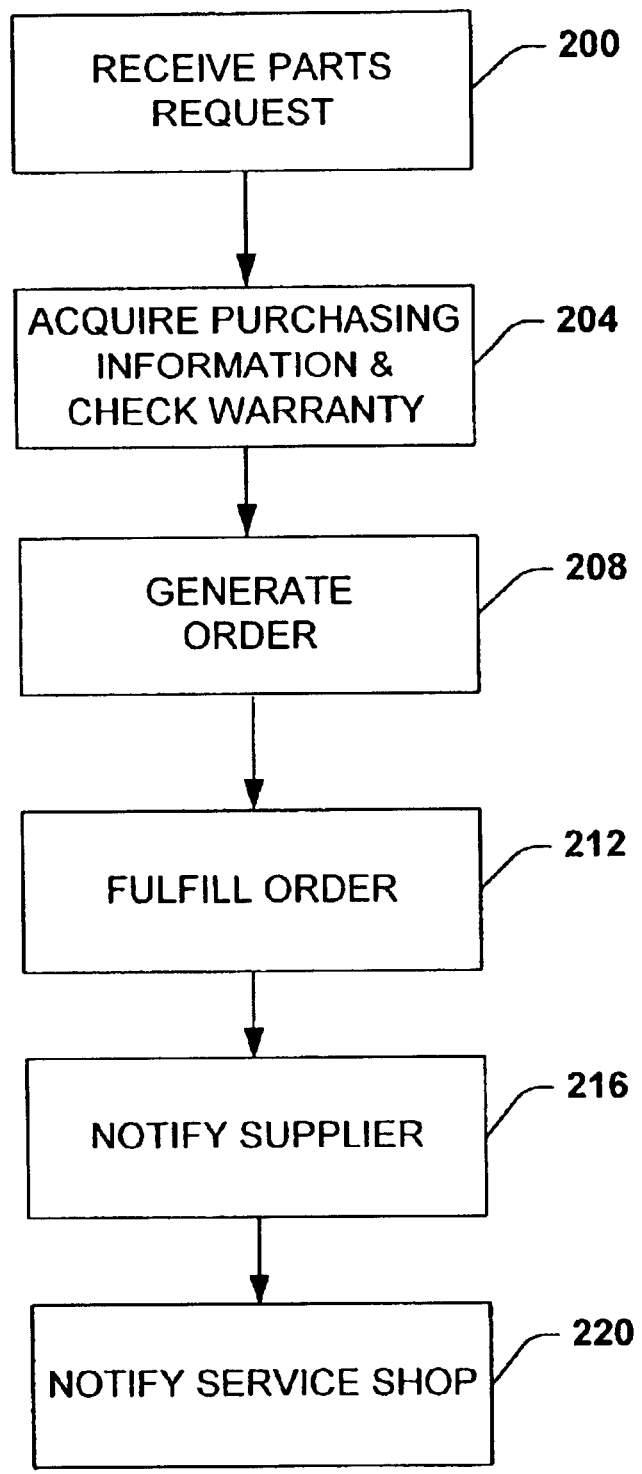
FIG. 5 is a flow chart diagram illustrating an automated parts ordering process in accordance with an aspect of the present invention.
Figure 6:
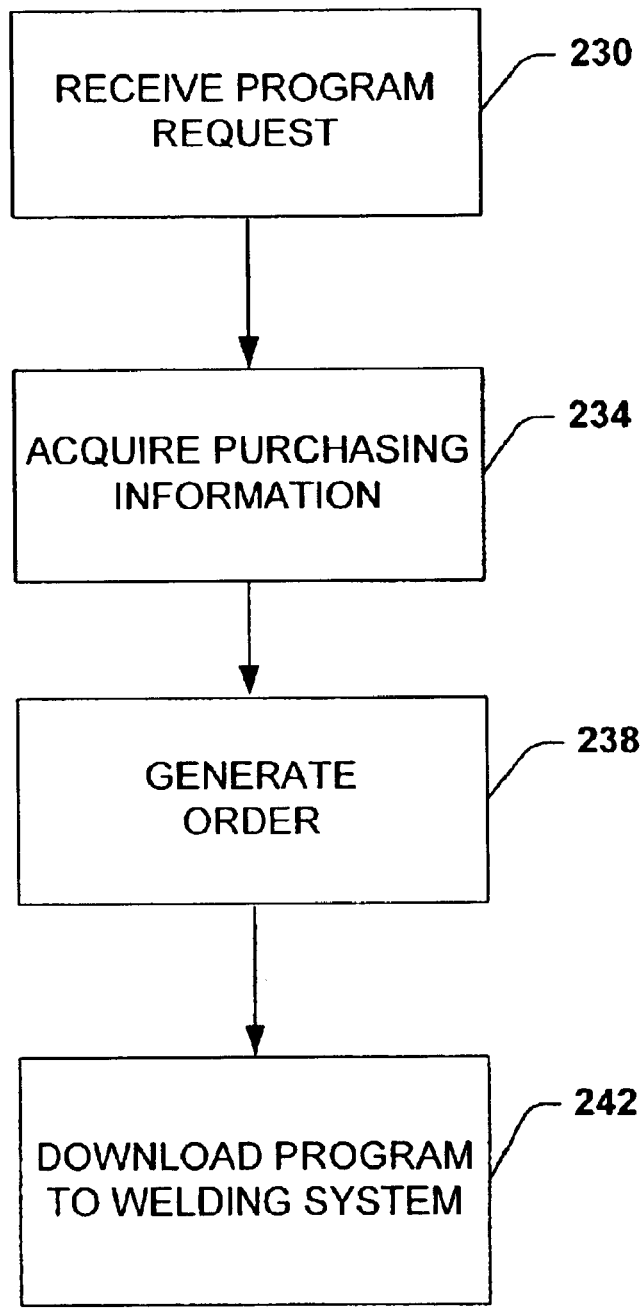
FIG. 6 is a flow chart diagram illustrating an automated welder program ordering process in accordance with an aspect of the present invention.

FIGS. 3, 5 and 6 described below, illustrate a methodology for providing various aspects of a welding information transfer and parts acquisition architecture in accordance with the present invention. While, for purposes of simplicity of explanation, the methodology is shown and described as a series of acts, it is to be understood and appreciated that the present invention is not limited by the number or order of acts, as some acts may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Turning now to FIG. 3, a methodology provides welding information transfer in accordance with the present invention. Beginning at 130, a weld object or broker is registered by querying local welding components and receiving version information such as revision levels or codes that indicate the current version of a welding system. At 134, links are established with a remote server to search for information relating to the version information in the weld object. This may include updating a table or list within the weld object to indicate the most recent document or stored welder program version levels associated with the components identified in the weld object. At 138, a determination is made as to whether the most recent welding information is contained in a local information server or in a remote information server. This may be achieved by comparing document/program version levels within the weld object to document/program version levels at the local information server, for example. If information is available locally, the process proceeds to 140 wherein information is retrieved from the local information server. If the information is not available locally, the process proceeds to 142 and retrieves information from a remote information server. From either 140 or 142, the process proceeds to 144 wherein a determination is made as to whether a replacement component or program/procedure has been selected from the retrieved information at 140 and 142. If a replacement component or program has been selected, the process proceeds to 146 and automatically generates a purchase order. If a replacement component or program has not been selected at 144, the process proceeds to 148 wherein a weld operator or user may utilize the retrieved information to maintain and service the welding system.

Figure 4:
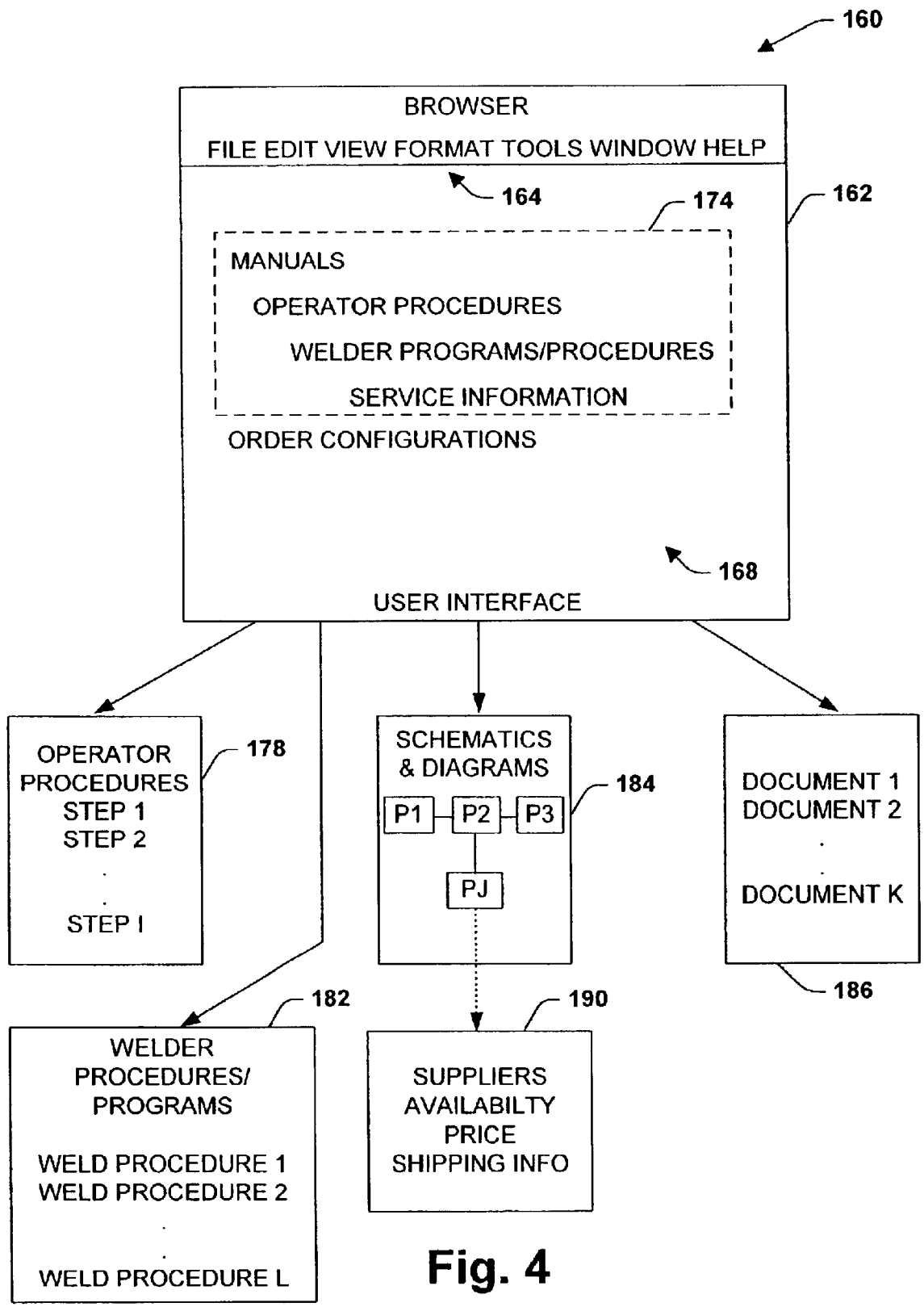
FIG. 4 is a schematic block diagram illustrating a welding interface and parts ordering system in accordance with an aspect of the present invention.

Referring now to FIG. 4, a system 160 illustrates a welding interface in accordance with the present invention. The system 160 includes a browser 162 that may be in the form of a graphical user interface (GUI) having an associated menu bar 164 for viewing and manipulating retrieved information from local or remote server systems. The browser 162 may include a display 168 to view substantially any type of information relating to a welding system. For example, this information may include weld operator manuals, operating procedures, welder programs/procedures, service information and interactive troubleshooting information to train and inform the welding operator. The display 168 may include a listing 174 of available documents, wherein further information is obtained by selecting a document or procedure and "drilling down" to more detailed menus. For example, an operator procedures menu is illustrated at reference numeral 178, wherein a series of 1 to I steps or acts, I being an integer, may be provided to guide or train a welding operator. A welder programs/procedures menu 182 illustrates one or more welding programs or procedures that can be downloaded to change the behavior of the welding system. Consequently, this enables the welding system to be adaptable to operate with different weld materials, components. and/or joining configurations, for example. A schematic or other diagram 184 may be provided wherein 1 to J welding parts or components, J being an integer, are diagrammatically displayed. Another menu 186 provides a more detailed listing of welding documents 1 through K, K being an integer, that may be selected and opened for viewing via a mouse click or other operator input, for example.

As documents, procedures or diagrams are displayed, welding components, parts, programs, and/or part or catalog numbers may be selected from the displayed menu by the welding operator to automatically generate and fulfill a parts acquisition as described above. For example, a single mouse "click" on a part designated as PJ in the schematic 182 can generate an order by invoking the welding information broker, linking the broker to a remote inventory and distribution receiving component, retrieving purchasing information, submitting the purchasing information to an ordering system to generate a purchase order, and fulfilling the order by submitting the generated purchase order to a fulfillment component associated with the inventory and distribution system. As an alternative, the browser 162 may be configured to cause a selected component to display supplier information, wherein a particular supplier is selected before automatically generating a purchase order. For example, a more detailed menu 190 may be displayed when selecting the part PJ. This menu 190 may display substantially all the suppliers who supply a given component, availability of the component, component price information such as net30 and entitlement to wholesale/ distributor pricing, shipping information such as FOB destination or FOB city of shipment, as well as other supplier information. Based upon the information presented in the menu 190, the welding operator can limit the generated purchase order to a supplier who most closely represents desired requirements such as how fast a component may be shipped and/or how much cost will the shipment entail. After selecting a supplier, a purchase order may be generated and fulfilled as described above. It is to be appreciated that a plurality of other menus, information formats, and information presentations may be displayed in accordance with the present invention.

Turning to FIG. 5, a methodology illustrates automatic parts acquisition in accordance with the present invention. At 200, a parts request is received by a remote server system. The parts request may include the selected part and includes information pertaining to the particular welding system associated with a weld object or broker. At 204, purchasing information is acquired relating to the selected component and/or other information within the welding system(s). The weld object is then updated with purchasing information. Additionally, warranty information associated with the selected part is checked to determine if the part should be supplied under warranty without cost to the purchaser or if the requested part should be billed according to cost of the requested part. At 208, a purchase order is automatically generated from a welding system that utilizes the purchasing information contained in the weld object or broker. At 212, an order is fulfilled by receiving the purchase order generated at 208 and determining a relevant supplier of the selected replacement component. At 216, a supplier is notified of the purchase order by transmitting the purchase order to the supplier. This may include e-mail or other electronic file transfers of the purchase order to the supplier. At 220, based on the warranty status of the requested part, a service shop or distributor may be notified to deliver the requested part.

FIG. 6 illustrates welder program ordering, configuration and adaptability aspects of the present invention. For example, if a new or different welding program or procedure is desired, the program may be requested by an operator, weld engineer or other user via a single action such as a mouse click. As an example, a welding program can be provided in a program list such as described above in FIG. 4, wherein a program may be selected and ordered similarly to the automated parts ordering process described above. To fulfill a program order, the user may then select (e.g., mouse click, keystroke) the desired program to be downloaded, wherein the welding information broker is updated with new version information of the downloaded program. Referring to 230 in FIG. 6, a program request is received by a remote server system. The program request may include the selected programs and includes information pertaining to the particular welding system associated with the welding information broker. At 234, purchasing information is acquired relating to the selected program and/or other information within the broker. The broker is then updated with purchasing information. At 238, a purchase order is automatically generated from a welding system that utilizes the purchasing information contained in the broker. At 242, the selected program is downloaded to the welding system. This can occur after the selected program is tested on the weldments under production and approval of a procedure qualification process.

Figure 7:
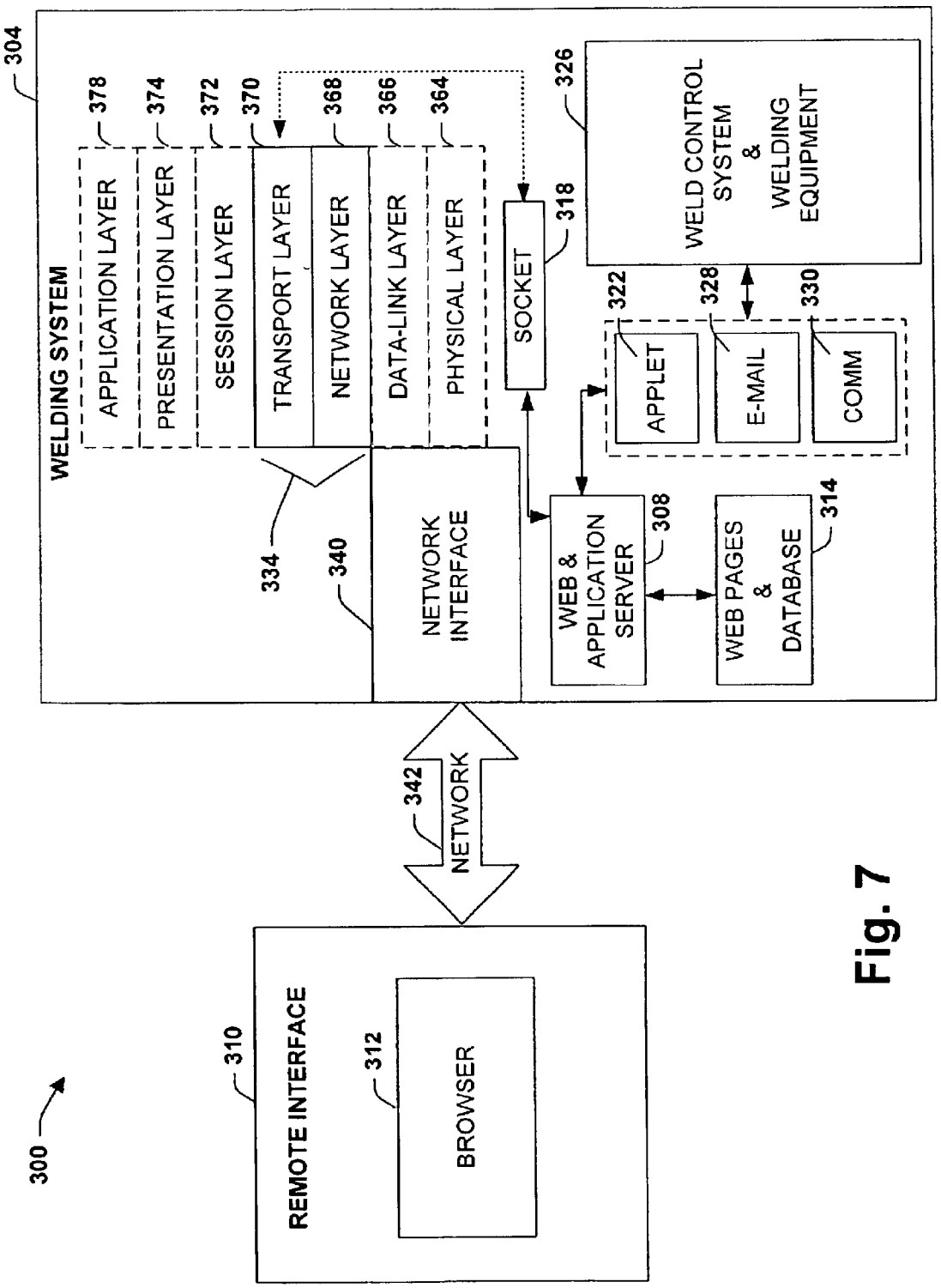
FIG. 7 is a schematic block diagram illustrating a more detailed network interface and communications architecture in accordance with an aspect of the present invention.

Referring now to FIG. 7, a system 300 illustrates a more detailed network communications architecture in accordance with the present invention. A welding system 304 may include a web server 308 that provides information exchange with a remote system 310. The remote system 310 may include a browser 312 that communicates with the web server 308. Welding information may be exchanged via web pages and/or content included within a database 314 associated with the web server 308. Web content may include but is not limited to such technologies as HTML, SHTML, VB Script, JAVA, CGI Script, JAVA Script, dynamic HTML, PPP, RPC, TELNET, TCP/IP, FTP, ASP, XML, PDF, WML as well as other formats. The browser 312 which can reside in the remote system 310 or other welding systems, communicates with the web server 308 via one or more sockets 318 and loads one or more objects such as an applet 322.

It is noted that each object or applet 322 may be associated with one or more sockets 318. As an example, the browser 312 may load a web page or other application from the welding server 308 via a public domain or standard socket such as a Hyper Text Transfer Protocol (HTTP) socket, a File Transfer Protocol (FTP) socket, a Simple Mail Transfer Protocol (SMTP) socket, a Remote Procedure Call (RPC) socket, a Remote Method Invocation (RMI) socket, a Java Database Connectivity (JDBC) socket, an Open Database Connectivity (ODBC) socket, a Secure Sockets Layer (SSL) socket, a Network File System (NFS) socket, a Windows socket such as Winsock, a Point-of-Presence 3 (POP3) socket and a TELNET socket. The web page may then enable other welding applications to be invoked and communicated with by opening or "bootstrapping" additional sockets 318 from a pool of public domain and/or custom sockets that interact with specific components and/or functionality within the welding system 304.

For example, the applet 322 may be configured to monitor welding components that communicate via a native welding system bus (not shown). When the applet 322 is invoked and loaded from the remote system either from the browser 312 and/or from another application, a Welding Application socket, such as a custom socket, and/or other public domain socket may be instantiated to exchange weld monitoring information between the applet 322 and the remote system 310. The Welding Application Socket (WAS) can be adapted to exchange a welding protocol between the remote system 310 and the welding system 304. Additionally, the WAS may be adapted to communicate with particular aspects and/or applications associated with the welding system (e.g., welding equipment, weld controller, weld monitor, consumable usage monitor) over an internal welding system bus, wherein the applications interact and communicate via the WAS to other local systems (e.g., web servers operatively coupled via a factory Intranet) and/ or to remote systems (e.g., browsers, monitors, controllers operatively couple via the Internet).

The applet 322 (e.g., JAVA applet) may run within the browser 312 to exchange information with the welding system 304. A JAVA Virtual Machine (JVM) may be included to run the browser 312 and execute the applets 322. JAVA Virtual Machines are a software implementation of a "virtual CPU" designed to run compiled JAVA code. This may include stand-alone JAVA applications as well as the applets 322 that are downloaded to run the browser 312. The applet 322 can further be configured to transmit welding operating data (e.g., arc start failure counts, consumable usage data, equipment utilization up/down time) to the manufacturer of the welding equipment, receive and display information (e.g., advertising, program upgrade, and product recall or upgrade new product introduction, and applications and service support) from the manufacturer. The applet 322 can also be adapted not to function (e.g., closes, sends error messages) unless the applet detects the presence of a welding power supply and/or other portion of the welding system from a named manufacturer and/or the presence of an Internet connection to the welding equipment manufacturer's data server.

Along with the applet 322 for serving the browser 312, the web server 308 may invoke other objects or programs for interfacing to a weld control system and associated welding equipment 326. For example, these programs may include an e-mail component 328 for sending unsolicited and/or other messages to the remote system 310. A communications component 330 may be provided to transfer files to or from the database 314. For example, a File Transfer Protocol (FTP) component may be provided to transfer files. As described above, the socket 318 interfaces with a TCP/IP stack 334 that may be associated with several layers. The layers transfer data to and from a network interface 340 that couples to the network 40. It is noted that logic from one or more of the layers may be incorporated within the network interface 340 and that more than one socket 318 may be employed to communicate with various objects within the welding system 304. For example, a stream socket may be employed that provides an end-to-end, connection-oriented link between two sockets utilizing TCP protocol. Another type socket is a datagram socket that is a connectionless service that utilizes User Datagram Protocol (UDP). UDP services are well suited to bursting traffic patterns and are employed to send control commands from the remote system 310 to the welding system 304. UDP enables a plurality of welding systems to receive control commands in a more concurrent manner.

As described above, the TCP/IP stack 334, which is well understood, may be associated with one or more other network layers. A physical layer 364 may be provided that defines the physical characteristics such as electrical properties of the network interface 340. A data-link layer 366 defines rules for sending information across a physical connection between systems. The TCP/IP stack 334 may include a network layer 368, which may include Internet protocol (IP) and/or Internet Protocol version 6 (IPv6), defines a protocol for opening and maintaining a path on the network 40. A transport layer 370 associated with the TCP/IP stack 334, may include Transmission Control Protocol (TCP), that provides a higher level of control for moving information between systems. This may include more sophisticated error handling, prioritization, and security features. A session layer 372, presentation layer 374, and application layer 378 which are well understood may also be optionally included that sit above the TCP/IP stack 334.

It is noted that the server 308 can be a web server or an HTTP server, wherein an application loaded from the welding system 304 to the remote system 310 can be a Java applet or a Java application, for example. The application may request web pages (e.g., HTML documents) from the welding system 304 via an HTTP socket, wherein the web pages are dynamically generated by the welding system 304 and may include live welder operating parameters. The web pages may be parsed by the application to extract welder operating parameters, wherein the operating parameters can be displayed graphically within the browser 312, processed by an algorithm, and/or recorded into a log file. Additionally, one or more URLs associated with the web pages may include commands, parameter settings changes, and/or instructions or functions to be executed by the welding system 304, when the web pages are requested by the remote system 310.

Figure 8:
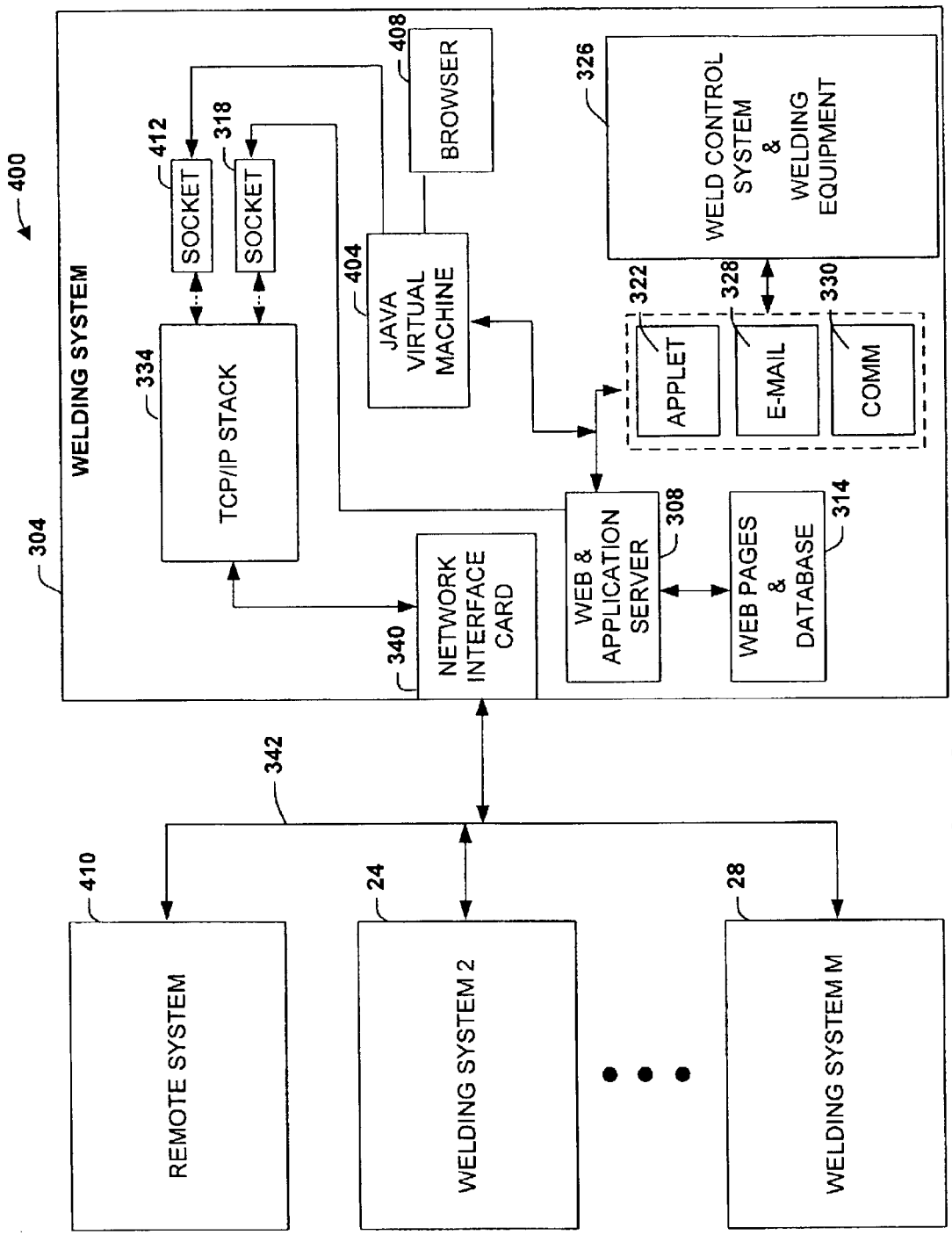
FIG. 8 is a schematic block diagram illustrating an integrated welding interface in accordance with an aspect of the present invention.

Referring now to FIG. 8, a system 400 illustrates an alternative aspect of the present invention. According to this aspect of the invention, a Java Virtual Machine 404 and associated browser 408 may be included within the welding system 304 to provide a local interface to one or more remote welding systems 24–28 and/or remote system 410. This enables an operator, for example, to load welding information from other systems, monitor/diagnose the local system 304 and/or other systems and send/receive orders from other systems. As illustrated, the JAVA Virtual Machine 404 may execute a JAVA application or program 409 and communicate to a socket 412. The socket 412 may be configured to interface between the JAVA applications/applets and the TCP/IP stack 334 to enable network communications.

Figure 9:
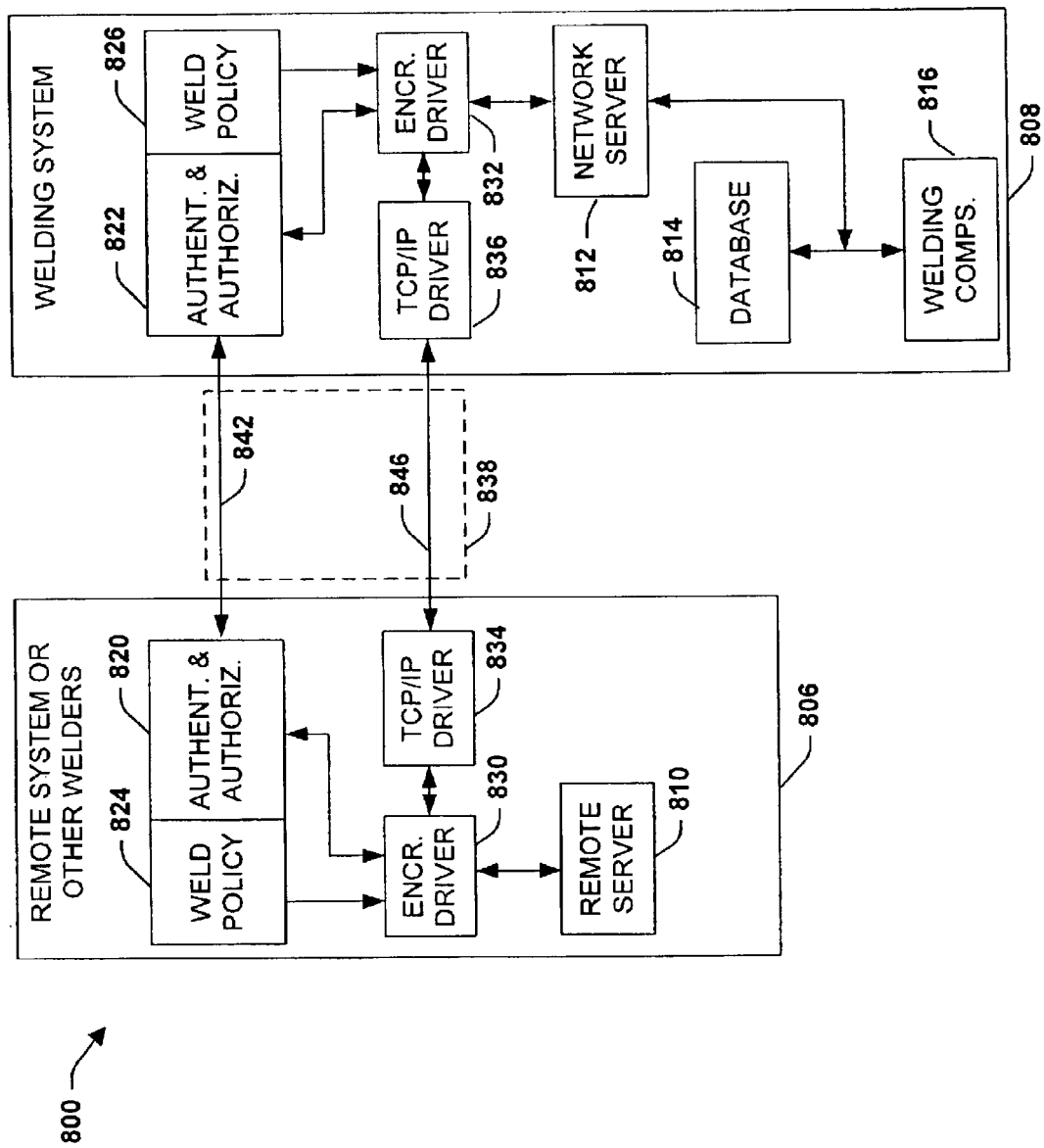
FIG. 9 is a schematic block diagram illustrating a welding security system in accordance with an aspect of the present invention.

Referring now to FIG. 9, a system 800 illustrates a welding and network security system in accordance with an aspect of the present invention. Given that welding information may be transferred over public networks such as the Internet, the system 800 provides encrypted data communications along with authentication and authorization services between a remote system 806 and one or more other welding systems 808. The remote system 806 may include a remote server 810 to communicate with a network server 812, database 814, and associated weld components 816 within the welding system 808. Authentication refers to a determination that a purported user or system is whom they claim to be. Authorization is the process of verifying that a user or system has been authorized by the welding system 808 to access welding system resources. Encryption is the conversion of data into a form, such as a ciphertest, that is not easily understood by unauthorized agents.

According to one aspect of the present invention, authentication, authorization, and non-repudiation may be established utilizing one or more of the following protocols. A Public Key Infrastructure (PKI) and X.509 Public Key Infrastructure Certificates may be employed to provide authentication and message integrity. A Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

According to another aspect of the present invention, encryption may be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETF) and in other sources.

The system 800 includes an Authentication and Authorization (AA) subsystem 820 and 822 for securing network traffic 838 between systems 806 and 808. The system 800 may also include weld policy modules 824 and 826 to enable configuration of the AA subsystems 820 and 822. The weld policy modules 824 and 826 may also provide security configuration information to encryption drivers 830 and 832 that communicate via TCP/IP drivers 834 and 836 thereby enabling secure network traffic 838 between the systems 806 and 808. A negotiation 842 may be initiated between the AA subsystems 820 and 822 in order to establish a machine level and/or user level trust between the systems. It is to be appreciated that other negotiations may occur between the remote system 806 and the welding system 808. These negotiations may be utilized to establish a secure (e.g., encrypted) data channel 846, for example, between the TCP/IP drivers 834 and 836.

The weld policy modules 824 and 826, retrieve a configured set of local security policies (e.g., from database or local cache) and distribute authentication and security settings to the AA modules 820, 822, and to the encryption Drivers 830,832. The security policies may be employed to define the levels of security and access provided to the welding system 808. For example, these policies may define access based upon the type of user. A systems engineer or supervisor, for example, may be granted access to all portions of the welding system 808 such as to enable configurations and or modifications within the welding system. In contrast, an operator, may be granted another type of security, wherein only those portions of the welding system 808 may be accessed to enable actual machine and/or manufacturing operations associated with the welding process. Welding policies may also be configured such that the type of machine, network access and/or location defines the level of access to the welding system 808. For example, local systems communicating over a local factory Intranet may be given a higher degree of access to the welding system than remote systems communicating from outside the factory over the Internet. It is to be appreciated that many other policies and/or rule sets may be configured to define user, machine, and/or location access to the welding system 808.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A welding and network information system, comprising:
   a welder operatively coupled to a network interface, the network interface communicates to at least one of a local database and a remote database; and
   at least one welding information broker to determine whether welding information in the at least one of the local database and the remote database is applicable to a current welding operation, the welding information broker initiates at least one network request based upon one or more information requests from the current welding operation.

2. The system of claim 1, the welding information broker initiates the at least one network request based upon at least one of an automatic determination and a manual request.

3. The system of claim 2, the at least one of the automatic determination and the manual request is initiated as part of at least one of a training procedure, a maintenance procedure, a troubleshooting procedure, a manufacturing procedure, a replacement procedure and purchasing procedure.

4. The system of claim 2, the network request is communicated across the Internet.

5. The system of claim 3, the at least one of the automatic determination and the manual request is initiated in accordance with at least one of a web site, a web page, a web service and a web browser.

6. The system of claim 2, the automatic determination is based upon searching the local database for the welding information as applied to the current welding operation and initiating the network request to the remote database if the welding information is unavailable in the local database.

7. The system of claim 2, the automatic determination is based upon comparing at least one revision level in the local database with a file received from the remote database.

8. The system of claim 7, the file is an XML file describing current revision levels.

9. The system of claim 2, a graphical user interface (GUI) to enable at least one of the procedures.

10. The system of claim 1, wherein the welding information broker is associated with at least one of a welding system on a local network and outside a welding system as an entity on a network.

11. The system of claim 1, wherein the welding information includes at least one of an operator manual, a troubleshooting procedure, a replacement component and a service manual.

12. The system of claim 11, further comprising a web page to select the replacement component from at least one of the operator manual, the troubleshooting procedure, and the service manual.

13. The system of claim 12, the replacement component is purchased and acquired from the web page.

14. The system of claim 11, further comprising an ordering, receiving, and fulfillment component to automatically acquire the replacement component.

15. The system of claim 1, further comprising a configuration protocol to enable configuration of the welding information broker.

16. The system of claim 15, the configuration protocol transmits at least one of a manufacturing history version, software version, firmware version, hardware type, serial number and model number.

17. The system of claim 1, further comprising a security component to facilitate communications over the network interface.

18. A method to retrieve welder information, comprising:
   registering at least one welding broker with version information relating to a welding system;
   determining if welding system information resides in a remote information server or in a local information sever via the at least one welding broker; and
   retrieving the welding system information from at least one of the remote information server and the local information server depending on the version information within the welding broker.

19. The method of claim 18, further comprising at least one of:

processing the welding system information via web services;

displaying manuals to provide guidance in the operation or service of a welding system;

utilizing the welding system information to troubleshoot the welding system; and identifying replacement components from the welding system information.

20. The method of claim 18, further comprising at least one of:

receiving an electronic request from a welding system;

generating an order from the electronic request;

fulfilling the generated order; and notifying a subsequent party in accordance with the generated order.

21. The method of claim 20, further comprising at least one of, displaying a status for the electronic request; and displaying an option to satisfy the electronic request.

22. A computer-readable medium having computer-executable instructions for executing at least a portion of the method of claim 18.

23. A system to retrieve welder information, comprising:

means for determining version information rotating to a welding system;

means for determining if at least one of local welding information and remote welding information is available for the welding system; and means for acquiring the at least one of the local welding information and the remote welding information depending on the version information.

24. The system of claim 23, further comprising means for initiating a remote transaction.

25. A signal for communicating between welding systems, comprising: the signal having a data packet comprising:

a first data field having version information relating to welding information; and a second data field relating to a request for the welding information.

26. An automated welding information and part acquisition system comprising:

a welder coupled to a network interface that communicates to at least one of a local and remote database;

at least one welding information broker to determine whether welding information in the at least one local database and the remote database is applicable to a present welding operation, the welding information broker initiates at least one network request based upon one or more information requests from the current welding operation; and a web page to select and purchase a replacement component from welding information including at least one of an operator manual, a troubleshooting procedure, and a service manual.

27. The system of claim 26, further comprising an ordering, receiving and fulfillment component to automatically acquire the replacement component.

* * * * *